No. 785,657. PATENTED MAR. 21, 1905.
B. G. BRAINE.
INSULATED STEP JOINT.
APPLICATION FILED FEB. 10, 1904.
6 SHEETS—SHEET 1.
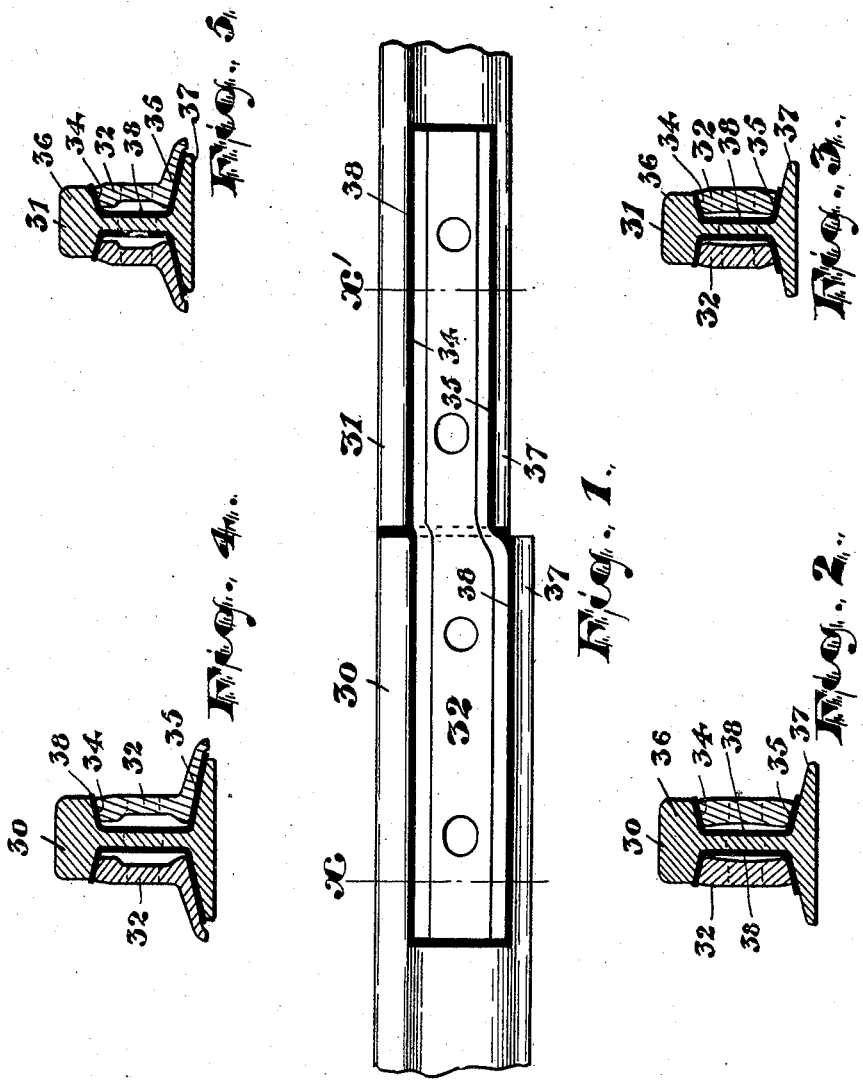
WITNESSES:
Ralph Lancaster
Russell M. Everett
INVENTOR:
Bancroft G. Braine,
BY
Charles H. Pell
ATTORNEY No. 785,657. PATENTED MAR. 21, 1905.
B. G. BRAINE.
INSULATED STEP JOINT.
APPLICATION FILED FEB. 10, 1904.
6 SHEETS—SHEET 2.
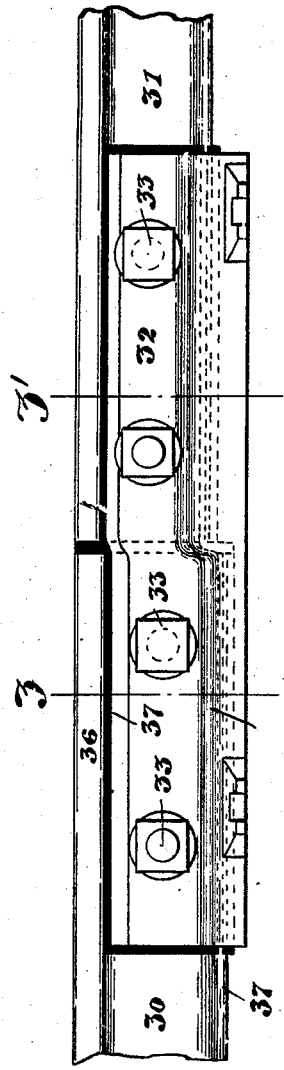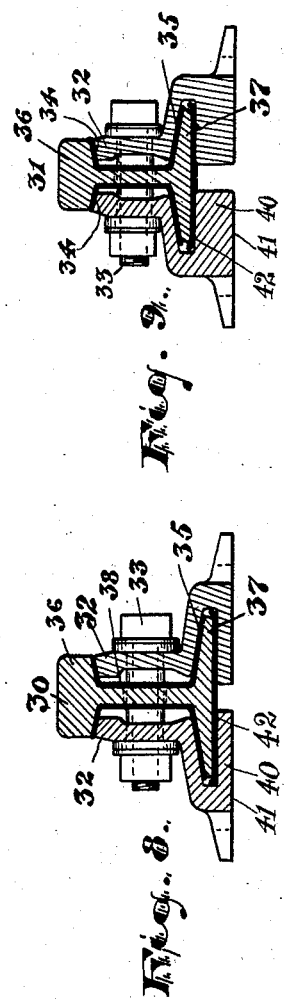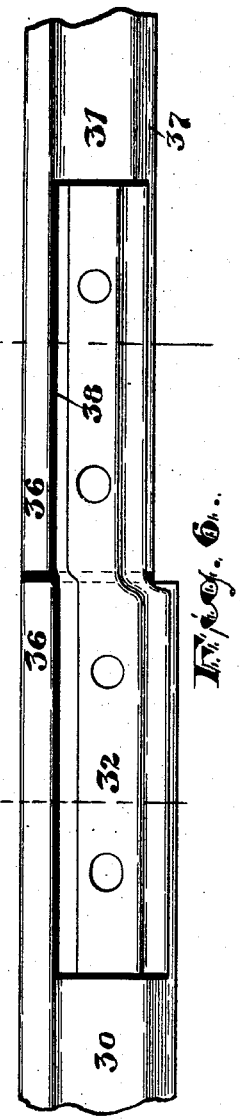
WITNESSES:
Ralph Lancaster
Russell M. Everett
INVENTOR
Bancroft G. Braine,
BY
Charles H. Pell
ATTORNEY No. 785,657. PATENTED MAR. 21, 1905.
B. G. BRAINE.
INSULATED STEP JOINT.
APPLICATION FILED FEB. 10, 1904.
6 SHEETS—SHEET 3.
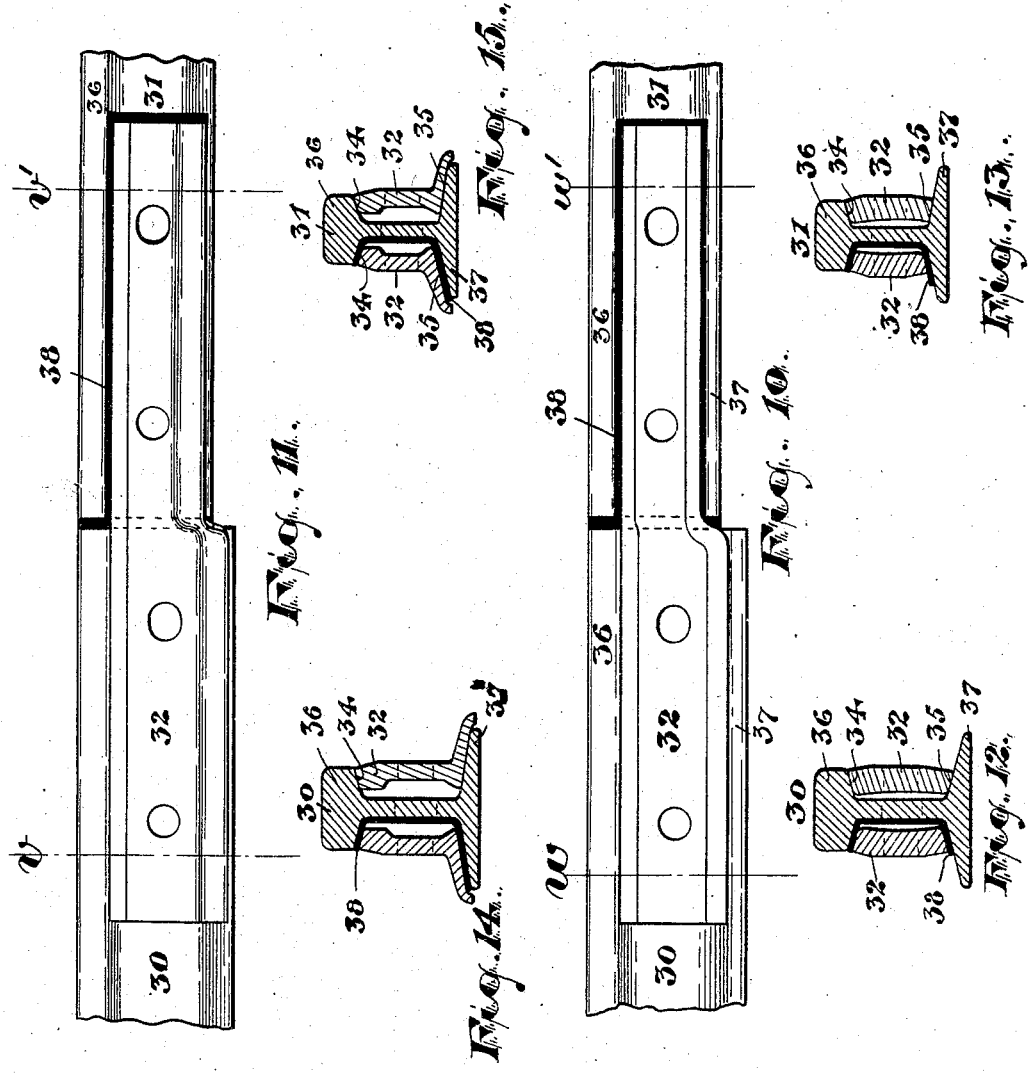
WITNESSES:
Ralph Lancaster
Russell M. Everett
INVENTOR
Bancroft G. Braine,
BY
Charles H. Pell,
ATTORNEY No. 785,657. PATENTED MAR. 21, 1905.
B. G. BRAINE.
INSULATED STEP JOINT.
APPLICATION FILED FEB. 10, 1904.
6 SHEETS—SHEET 4.
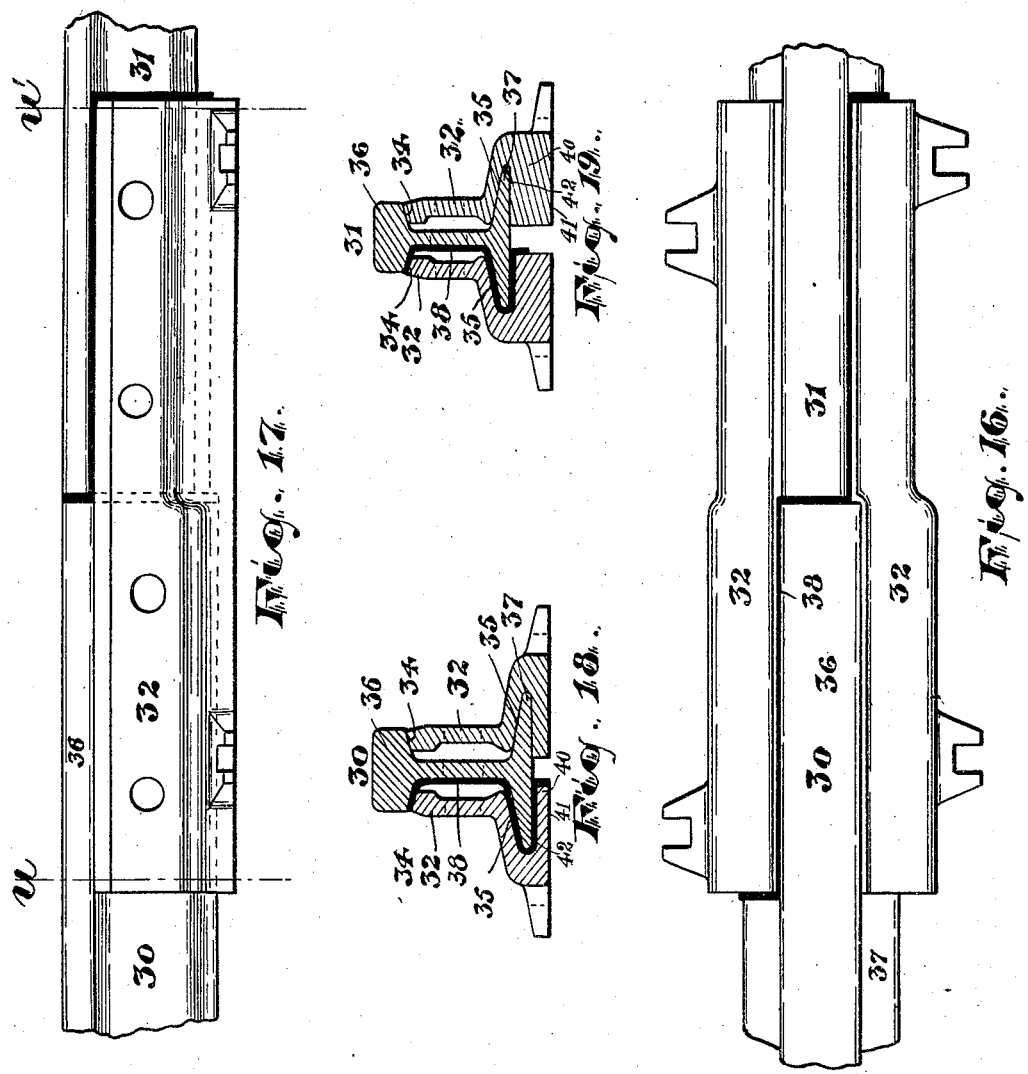
WITNESSES:
Ralph Lancaster
Russell M. Everett
INVENTOR
Bancroft G. Braine,
BY
Charles H. Pell
ATTORNEY No. 785,657. PATENTED MAR. 21, 1905.
B. G. BRAINE.
INSULATED STEP JOINT.
APPLICATION FILED FEB. 10, 1904.
6 SHEETS—SHEET 5.
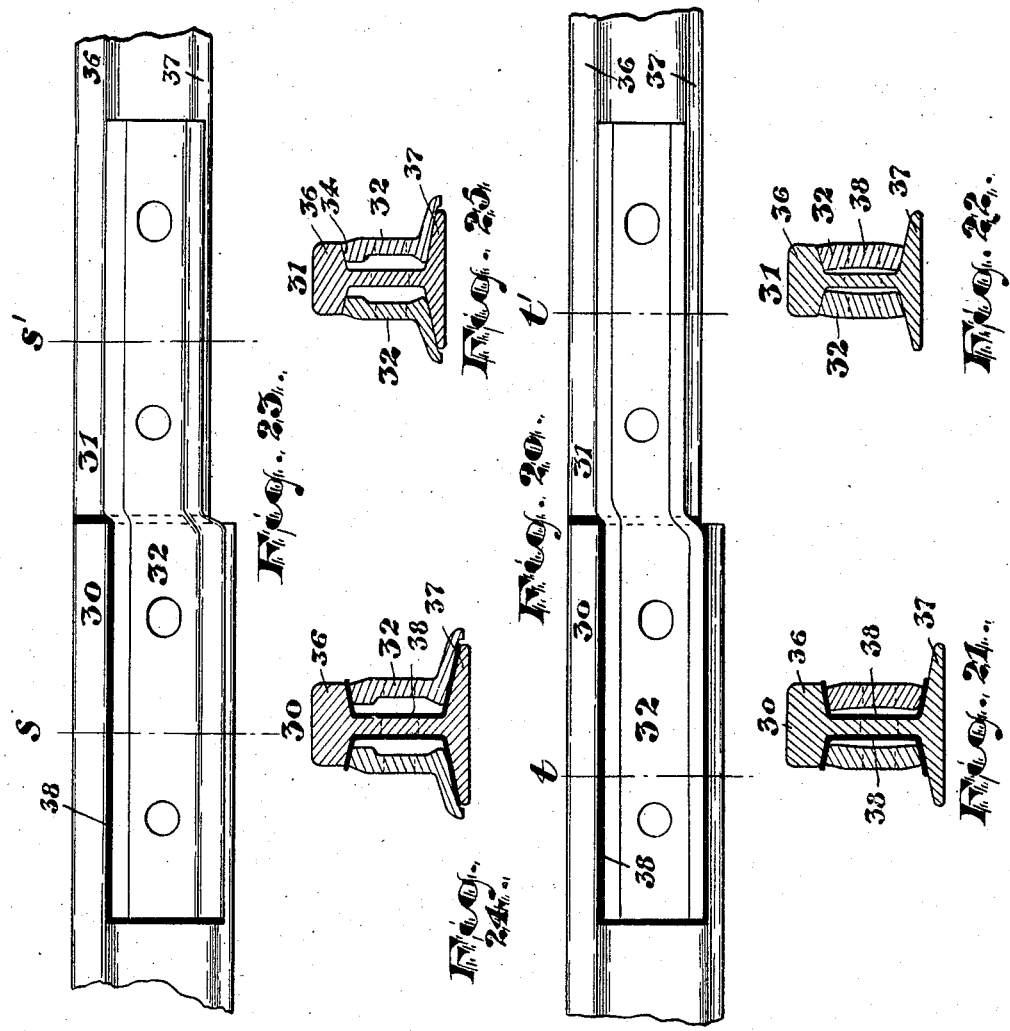
WITNESSES:
Ralph Lancaster
Russell M. Everett
INVENTOR:
Bancroft G. Braine
BY
Charles H. Pell
ATTORNEY No. 785,657. PATENTED MAR. 21, 1905.
B. G. BRAINE.
INSULATED STEP JOINT.
APPLICATION FILED FEB. 10, 1904.
6 SHEETS—SHEET 6.
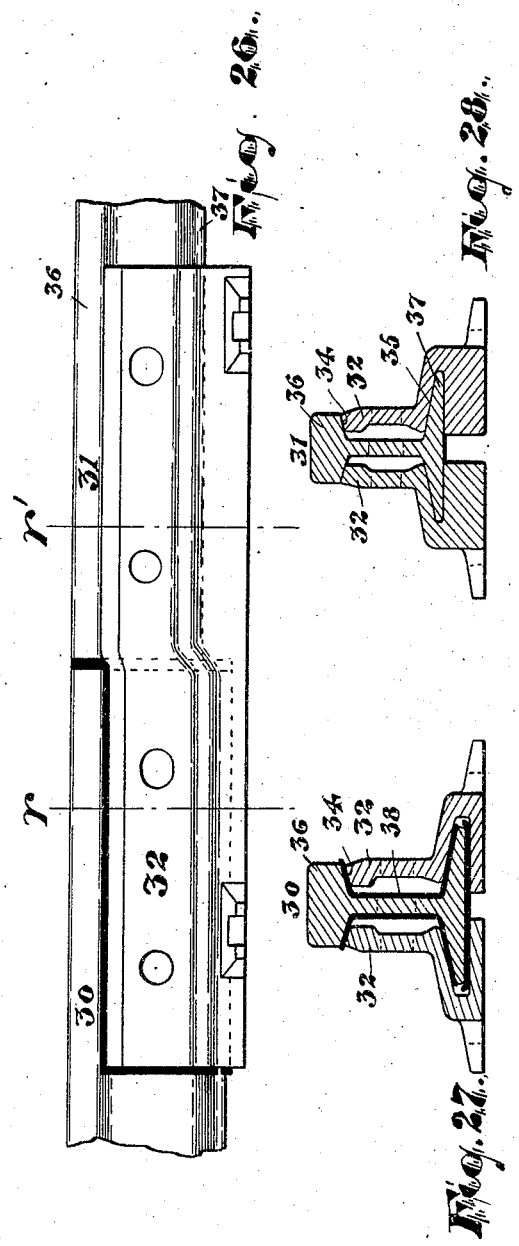
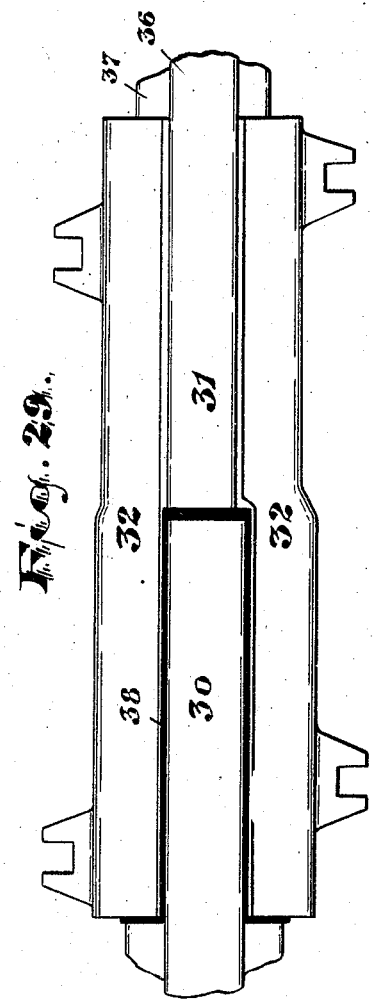
WITNESSES:
Ralph Lancaster
Russell M. Everett
INVENTOR
Bancroft G. Braine,
BY Charles H. Pell
ATTORNEY.

No. 785,657.

Patented March 21, 1905.

UNITED STATES PATENT OFFICE.

BANCROFT G. BRAINE, OF NEW YORK, N. Y., ASSIGNOR TO THE CONTINUOUS RAIL JOINT COMPANY OF AMERICA, A CORPORATION OF NEW JERSEY.

INSULATED STEP-JOINT.

SPECIFICATION forming part of Letters Patent No. 785,657, dated March 21, 1905.

Application filed February 10, 1904. Serial No. 192,897.

*To all whom it may concern:*

Be it known that I, BANCROFT G. BRAINE, a citizen of the United States, residing at New York, in the borough of Brooklyn and State of New York, have invented certain new and useful Improvements in Insulated Step-Joints; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to avoid the necessity of furnishing under certain conditions an extra joint at points contiguous to the connection of a rail of one cross-section with that of a larger or smaller cross-section where said rails are to be electrically insulated one from another, and thus to reduce the cost of construction and to secure a more permanent and durable insulation and to secure other advantages and results, some of which may be referred to hereinafter in connection with the description of the working parts.

Heretofore it has been customary in railway construction to employ in connection with an electrical signaling system, where the signaling system requires an insulation of the rails and said insulation is found to come closely adjacent or contiguous to a step-joint, connecting-rails of different dimensions in cross-section, to first insert at a point or points near to the step-joint one of the insulated joints of the market to separate one block or section of the electrical system from the next block or section in order and to insert at another point near the insulated joint a step-joint of any usual type. To avoid the cost of two complete joints of the old types is the special object of this invention.

With these ends in view my invention consists in an insulated step-joint for railway-rails and in the arrangements and combinations of parts of the same, all substantially as will be hereinafter set forth and finally embraced in the clauses of the claim.

Referring to the accompanying drawings, which comprise six sheets, and showing the application of said invention to various types of railway-rails, Figure 1 is a side elevation showing my invention as applied to a joint having the splice-bar type of connecting-plates. Fig. 2 is a section of the same, taken at line $x$. Fig. 3 is a section taken at line $x'$ of Fig. 1. Figs. 4 and 5 are sections showing joints in which the angle-bar type of connecting-plates are employed, the sections being taken through lines $y$ and $y'$ of Fig. 6; and Fig. 6 is a side elevation of a joint of the angle-bar type of rail connections. Fig. 7 is a side elevation showing an insulated step-joint, showing the invention as applied to the "continuous" type of rail joint or connections. Figs. 8 and 9 are sectional views taken, respectively, through lines $z$ and $z'$ of Fig. 7. Figs. 10 and 11 are side elevations showing the stepped construction applied to a joint having a zigzag or cross arrangement of insulation in which the insulation lies between the connecting bars or plates and the rails and between the ends of the opposing rail ends, and yet there is a direct metallic supporting contact of each rail with one of the connecting plates or bars to secure the desired firmness and stiffness, as more fully described in my application for a patent filed July 23, 1902, Serial No. 116,604, now pending in the Patent Office; and Figs. 12 and 13 are sectional views taken, respectively, on lines $w$ and $w'$ of Fig. 10. Figs. 14 and 15 are sectional views taken on lines $v$ and $v'$, respectively, of Fig. 11. Fig. 16 is a plan, and Fig. 17 is a side elevation, showing what I may term "cross" or "zigzag" insulation, referred to in my prior contemporaneous application; and Figs. 18 and 19 are sectional views of the same, taken through lines $u$ $u'$, respectively. Fig. 20 is a side elevation of a joint employing splice-bars and insulation contacting with but one rail member of the joint; and Figs. 21 and 22 are respectively sections taken through lines $t$ $t'$. Fig. 23 is a side elevation showing a joint having similar insulation to that shown in Fig. 20, but employing an angle-bar type of connecting-plates; and Figs. 24 and 25 are sections of the same, taken on lines s s', respectively. Fig. 26 is a side elevation showing the insulation in contact with one rail member of the joint only and showing the connecting-plates of the continuous type of construction. Figs. 27 and 28 are sections of the same, taken through lines r and r', respectively. Fig. 29 is a plan of the type of joint shown in Fig. 26.

In Figs. 7, 8, 9, 17, 18, and 19 I have shown a joint of the continuous type in which the connecting-plates are provided not only with bearings to oppose the under side of the head of the rail and the upper side of the base-flange of the rail, but also with extensions 40 underneath said rails and on which said rails are seated. Comparing Fig. 8 with Fig. 9 and Fig. 18 with Fig. 19, it will be noted that said extensions are of varying thickness, so that the base 41 of each plate lies in a single horizontal plane from end to end, as in Fig. 17; but the upper bearings 42 for the rails are at different elevations to accord with the differences in the vertical dimensions of the rails. The stepped or offset bearing in these cases are also proportioned to form recesses between the plate and rail where it is found desirable to insert the insulation for electrically insulating one rail from the other.

In said drawings, 30 indicates one of the railway-rails, which is of large cross-section, and 31 indicates the adjacent rail of smaller cross-section. 32 represents the connecting-plates arranged at opposite sides of said rails and uniting or joining the same, the said connecting-plates and rails being bolted together by means of bolts 33, Fig. 7, in any usual manner. The said connecting-plates 32 at their opposite ends have bearings 34 35, adapted to engage, respectively, the under side of the heads 36 and the upper side of the flanges 37 of the rail or the insulation 38, interposed therebetween. Said bearings 34 35 are stepped or are nearer one another at one end of the connecting-plate than at the other end, and consequently the insulation is correspondingly shaped so as to prevent an electric connection between the rails.

The stepped bearings are so disposed in their relations as to provide space for the insulation, the spaces being varied to suit the different types and classes of joints, as will be obvious from a close examination of the several drawings.

While I have shown my improved joint modified in accordance with various detail constructions of connecting-plates and modes of insulation, I am aware that further modifications may be made without departing from the spirit and scope of the invention.

Having thus described my invention, what I claim as new is—

1. The improved rail, in which are combined rails of varying cross-section, connecting-plates having stepped bearings to oppose the head and base flanges of said rails and interposed insulation, the said stepped bearings being reduced to permit the insertion of the insulation between the rails and connecting-plates, substantially as set forth.

2. The improved rail-joint herein described in which are combined with the alined rail ends varying in cross-section, connecting-plates arranged and secured on opposite sides of said rail ends and having bearings which are offset or stepped in correspondence with the variations in the opposite rail ends, the bearings of the steps or offsets being partly reduced and having insulation therebetween to insulate one rail end from the other.

3. The insulated step-joint herein described, comprising the rails varying in cross-section, connecting-plates having bearings to oppose the under sides of the heads of the rails and both the upper and under sides of the base-flanges of the said rails, said connecting-plates being offset or stepped on correspondence with the variation in the rail ends and the offsets or steps being reduced to receive insulation, and said insulation being interposed between the rails and connecting-plates to electrically insulate one rail from the other, substantially as set forth.

In testimony that I claim the foregoing I have hereunto set my hand this 8th day of February, 1904.

BANCROFT G. BRAINE.

Witnesses:
 CHARLES H. PELL,
 RUSSELL M. EVERETT.